United States Patent
Bharti et al.

(10) Patent No.: US 10,685,294 B2
(45) Date of Patent: *Jun. 16, 2020

(54) HARDWARE DEVICE BASED SOFTWARE SELECTION

(71) Applicant: INTERNATIONAL BUSINESS MACHINES CORPORATION, Armonk, NY (US)

(72) Inventors: Harish Bharti, Pune (IN); Rajesh K. Saxena, Thane East (IN); Balakrishnan Sreenivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 694 days.

This patent is subject to a terminal disclaimer.

(21) Appl. No.: 15/472,921

(22) Filed: Mar. 29, 2017

(65) Prior Publication Data

US 2018/0285763 A1    Oct. 4, 2018

(51) Int. Cl.
  *G06F 9/44*    (2018.01)
  *G06N 20/00*   (2019.01)
  *G06F 8/35*    (2018.01)

(52) U.S. Cl.
  CPC ............. *G06N 20/00* (2019.01); *G06F 8/355* (2013.01)

(58) Field of Classification Search
  None
  See application file for complete search history.

(56) References Cited

U.S. PATENT DOCUMENTS

| | | |
|---|---|---|
| 7,117,351 B2 | 10/2006 | O'Connor et al. |
| 7,657,542 B2 | 2/2010 | Sundararajan et al. |
| 8,639,487 B1 | 1/2014 | Ezer et al. |
| 8,719,776 B2 | 5/2014 | Eteminan et al. |

(Continued)

FOREIGN PATENT DOCUMENTS

JP    2011197799    10/2011

OTHER PUBLICATIONS

Friedman, Mark J.; Updated List of IBM Patents or Patent Applications Treated as Related; Jan. 9, 2019; 1 page.

(Continued)

*Primary Examiner* — Insun Kang
(74) *Attorney, Agent, or Firm* — Schmeiser, Olsen & Watts; Mark C. Vallone

(57) ABSTRACT

A method and system for improving an operation of an automated IT system is provided. The method includes identifying software applications associated with requirements of processes executed by a hardware device with respect to an IT system. An ordered set of software solutions for modifying the software applications is generated. Sampling software code is generated by applying a sampling technique for enabling the hardware device to execute learning software code with respect to database systems. The sampling software code is executed for enabling an automated learning process applying a feature learning technique for identifying a set of software applications and enabling an evaluation of the software applications with respect to organizational parameters for identifying an organizational fitness for the set of software applications. A software application and associated feature are identified and the software application is executed resulting in improved operation of the hardware device.

20 Claims, 9 Drawing Sheets

(56) References Cited

U.S. PATENT DOCUMENTS

| | | |
|---|---|---|
| 8,799,436 B2 | 8/2014 | Ayachitula et al. |
| 8,875,091 B1 | 10/2014 | Rouleau et al. |
| 9,009,193 B2 | 4/2015 | Callery et al. |
| 9,009,694 B2 | 4/2015 | Dirico |
| 9,032,373 B1 | 5/2015 | Gupta et al. |
| 9,473,931 B2 | 10/2016 | Payyappilly et al. |
| 9,639,341 B2 | 5/2017 | Freiter |
| 9,720,799 B1 | 8/2017 | Lachwani et al. |
| 9,742,619 B2 | 8/2017 | Andreev et al. |
| 9,977,656 B1* | 5/2018 | Mannopantar ............ G06F 8/36 |
| 10,042,614 B1 | 8/2018 | Bharti |
| 10,101,971 B1 | 10/2018 | Bharti |
| 10,255,042 B2 | 4/2019 | Bharti |
| 2003/0084085 A1 | 5/2003 | Breidenbach |
| 2006/0150143 A1 | 7/2006 | Andreev et al. |
| 2006/0156274 A1 | 7/2006 | Andreev et al. |
| 2007/0300204 A1 | 12/2007 | Andreev et al. |
| 2009/0119545 A1 | 5/2009 | Pram et al. |
| 2009/0124241 A1 | 5/2009 | Krishnaswamy et al. |
| 2009/0307660 A1 | 12/2009 | Srinivasan |
| 2010/0031247 A1 | 2/2010 | Arnold et al. |
| 2010/0131928 A1 | 5/2010 | Parthasarathy et al. |
| 2011/0099532 A1 | 4/2011 | Coldicott et al. |
| 2011/0107327 A1 | 5/2011 | Barkie et al. |
| 2011/0154317 A1 | 6/2011 | Madduri et al. |
| 2011/0166849 A1 | 7/2011 | Dube et al. |
| 2012/0180027 A1 | 7/2012 | Yu et al. |
| 2012/0246612 A1 | 9/2012 | Ji et al. |
| 2013/0247022 A1 | 9/2013 | Dejana et al. |
| 2013/0346260 A1 | 12/2013 | Jubran |
| 2014/0007070 A1 | 1/2014 | Huang et al. |
| 2014/0173600 A1 | 6/2014 | Ramakrishnan Nair |
| 2015/0033208 A1 | 1/2015 | Krishna et al. |
| 2015/0066563 A1 | 3/2015 | McLees et al. |
| 2015/0339111 A1 | 11/2015 | Kedia |
| 2016/0147518 A1 | 5/2016 | Dimitrakos et al. |
| 2016/0188130 A1 | 6/2016 | Harris |
| 2016/0269264 A1* | 9/2016 | Ekambaram ........ G06F 11/3409 |
| 2016/0274875 A1* | 9/2016 | Farooqi ................. G06F 8/34 |
| 2017/0147291 A1* | 5/2017 | Vega ..................... G06F 8/30 |
| 2017/0213154 A1* | 7/2017 | Hammond ........... G06K 9/6257 |
| 2017/0255871 A1* | 9/2017 | Macready ............ G06K 9/6277 |
| 2018/0113746 A1* | 4/2018 | Mora Lopez ......... G06F 9/5055 |
| 2018/0232211 A1* | 8/2018 | Maurya ................. G06N 20/00 |
| 2018/0267779 A1* | 9/2018 | Leonelli ................. G06F 8/34 |
| 2018/0285080 A1 | 10/2018 | Bharti |
| 2018/0285081 A1 | 10/2018 | Bharti |
| 2018/0293517 A1* | 10/2018 | Browne ............... G06F 16/951 |
| 2019/0004771 A1 | 1/2019 | Bharti |
| 2019/0146757 A1 | 5/2019 | Bharti |
| 2020/0005142 A1* | 1/2020 | Lie ...................... G06N 3/10 |

OTHER PUBLICATIONS

Friedman, Mark J.; Updated List of IBM Patents or Patent Applications Treated as Related; Nov. 15, 2019; 1 page.

Friedman, Mark J.; Updated List of IBM Patents or Patent Applications Treated as Related; May 3, 2018; 1 page.

Bandor, Michael S.; Quantitative Methods for Software Selection and Evaluation; Carnegie Mellon University Technical Note, Acquisition Support Program; Sep. 2006; 23 pages.

Lin, Han et al.; COTS Software Selection Process; Sandia National Laboratories; May 2006; 24 pages.

Friedman, Mark J.; List of IBM Patents or Patent Applications Treated as Related; Mar. 29, 2017; 1 page.

Rogers, Kishau; 20 Criteria for Selecting Business Software; Websmith Group; Nov. 23, 2011; URL: http://www.websmithgroup.com/blog/business/criteria-forselecting-businesssoftware/; 4 pages.

Queenette, Udoh-Ilomechine et al.; Selection Criteria for Computer Software and Hardware: A Case Study of Six University Libraries in Nigeria; Chinese Librarianship: an International Electronic Journal, 32; Aug. 17, 2011; 9 pages.

Li, Yan et al.; A Multiple Criteria Decision Analysis (MCDA) Software Selection Framework; 2014 47th Hawaii International Conference on System Science; Jan. 6-9, 2014; pp. 1084-1094.

\* cited by examiner

HARDWARE DEVICE BASED SOFTWARE SELECTION

FIELD

The present invention relates generally to a method for selecting software applications and in particular to a method and associated system for improving software technology associated with an operation of a hardware device via generation and execution of self-learning software code.

BACKGROUND

Accurately determining applicable instructions for operating a device typically includes an inaccurate process with little flexibility. Determining system solutions with respect to code may include a complicated process that may be time consuming and require a large amount of resources. Accordingly, there exists a need in the art to overcome at least some of the deficiencies and limitations described herein above.

SUMMARY

A first aspect of the invention provides an automated IT system operational improvement method comprising: identifying, by a processor of a hardware device of an IT system, software applications associated with requirements of processes executed by the hardware device with respect to the IT system, wherein the requirements are comprised by metadata; generating, by the processor based on results of the identifying, an ordered set of software based solutions associated with features for modifying the software applications; generating, by the processor based on software based solutions, sampling software code by applying a syndicated sampling technique for enabling the hardware device to execute cognitive self-learning software code with respect to a plurality of database systems; executing, by the processor, the sampling software code for enabling an automated learning process applying a feature learning technique for identifying a set of applicable software applications of the software applications; executing, by the processor, the sampling software code for enabling an evaluation of the software applications with respect to organizational parameters defined in the metadata for identifying an organizational fitness for the set of applicable software applications; identifying, by the processor based on results of the executing, a software application of the set of applicable software applications and an associated feature of the features; and executing, by the processor, the software application resulting in improved operation of the hardware device.

A second aspect of the invention provides a computer program product, comprising a computer readable hardware storage device storing a computer readable program code, the computer readable program code comprising an algorithm that when executed by a processor of a hardware device of an IT system implements an automated IT system operational improvement method, the method comprising: identifying, by the processor, software applications associated with requirements of processes executed by the hardware device with respect to the IT system, wherein the requirements are comprised by metadata; generating, by the processor based on results of the identifying, an ordered set of software based solutions associated with features for modifying the software applications; generating, by the processor based on software based solutions, sampling software code by applying a syndicated sampling technique for enabling the hardware device to execute cognitive self-learning software code with respect to a plurality of database systems; executing, by the processor, the sampling software code for enabling an automated learning process applying a feature learning technique for identifying a set of applicable software applications of the software applications; executing, by the processor, the sampling software code for enabling an evaluation of the software applications with respect to organizational parameters defined in the metadata for identifying an organizational fitness for the set of applicable software applications; identifying, by the processor based on results of the executing, a software application of the set of applicable software applications and an associated feature of the features; and executing, by the processor, the software application resulting in improved operation of the hardware device.

A third aspect of the invention provides a hardware device of an IT system comprising a processor coupled to a computer-readable memory unit, the memory unit comprising instructions that when executed by the computer processor implements an automated IT system operational improvement method comprising: identifying, by the processor, software applications associated with requirements of processes executed by the hardware device with respect to the IT system, wherein the requirements are comprised by metadata; generating, by the processor based on results of the identifying, an ordered set of software based solutions associated with features for modifying the software applications; generating, by the processor based on software based solutions, sampling software code by applying a syndicated sampling technique for enabling the hardware device to execute cognitive self-learning software code with respect to a plurality of database systems; executing, by the processor, the sampling software code for enabling an automated learning process applying a feature learning technique for identifying a set of applicable software applications of the software applications; executing, by the processor, the sampling software code for enabling an evaluation of the software applications with respect to organizational parameters defined in the metadata for identifying an organizational fitness for the set of applicable software applications; identifying, by the processor based on results of the executing, a software application of the set of applicable software applications and an associated feature of the features; and executing, by the processor, the software application resulting in improved operation of the hardware device.

The present invention advantageously provides a simple method and associated system capable of accurately determining applicable instructions for operating a device.

DETAILED DESCRIPTION

Figure 1:
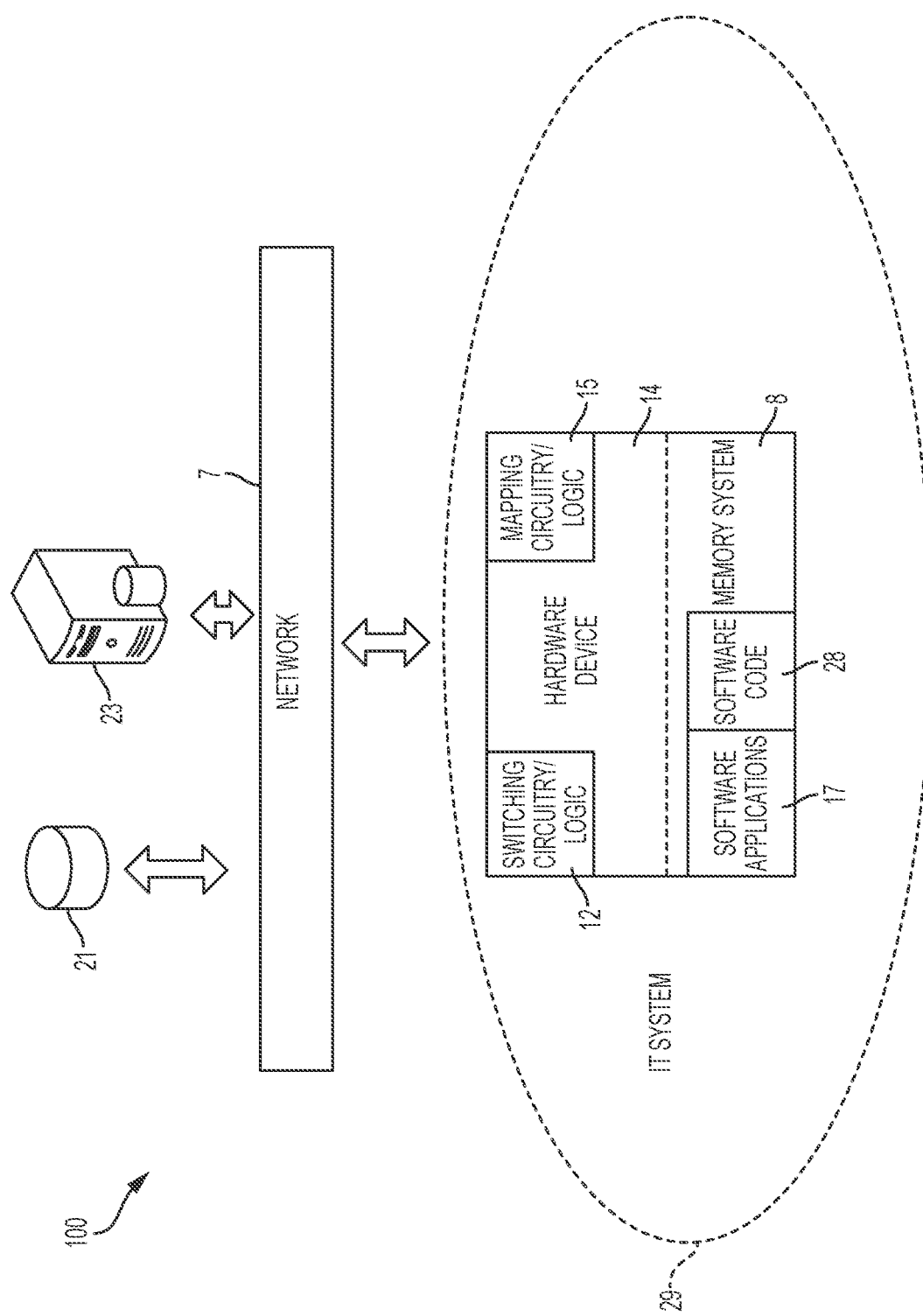
FIG. 1 illustrates a system for improving hardware device operation by generating self-learning and/or replicating software code, in accordance with embodiments of the present invention.

FIG. 1 illustrates a system 100 for improving hardware device operation by generating self-learning and/or replicating software code, in accordance with embodiments of the present invention. System 100 enables a process for improving hardware/software technology by sampling software code and executing a resulting software application. System 100 is enabled to automatically select software for an operational improvement project by mapping software/hardware requirements to IT system frameworks determining associated capabilities and processes. System 100 utilizes a meta data model for evaluating software applications at different levels of granularity of functional capabilities based on suitability for requirements for a given operational improvement project in combination with a large number of functional and non-functional parameters extracted from software offering repositories, technical databases, past software solutions, and IT system technology strategies. System 100 enables an accurate software/hardware mechanism configured to fine tune weighting of various target software selection framework parameters for each machine client such that a malfunction risk is minimized by employing syndication guided software sampling strategy in combination with unsupervised feature learning software with respect to identified target software solution options. Additionally, system 100 provides a metadata based model and software implementation approach to combine sentiment software code inputs comprising applicable code based parameters from network based Websites for providing the ability to include a broader user interface view for scoring individual software parameters. The software parameters enable software code for selecting and generating recursive software feature learning processes (via self-learning software code) to reduce data storage.

System 100 of FIG. 1 includes a server 23 and a database system 21 connected through a network 7 to an IT system 29 comprising a hardware device 14. IT system 29 may comprise a plurality of hardware devices (similar to hardware device 14) and/or any type of IT type of device. Hardware device 14 comprises switching circuitry/logic 12, mapping circuitry/logic 15, and a memory system. Memory system comprises software applications 17 and software code 28. Server 23, database system 21, and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 23, database system 21, and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-3. The specialized discrete non-generic analog, digital, and logic based circuitry (e.g., switching circuitry/logic 12, mapping circuitry/logic 15, etc.) may include proprietary specially designed components (e.g., a specialized integrated circuit, such as for example an Application Specific Integrated Circuit (ASIC) designed for only implementing an automated process improving hardware device operation by generating self-learning software code. Hardware device 14 includes memory system 8 comprising a software application and software code 28. The memory system 8 may include a single memory system. Alternatively, the memory system 8 may include a plurality of memory systems. Network 7 may include any type of network including, inter alia, a local area network, (LAN), a wide area network (WAN), the Internet, a wireless network, etc.

System 100 enables a process for determining a complete set of software applications and associated software platforms required to fulfill a given set of hardware/software based operational requirements (i.e., functional and non-functional requirements). System 100 comprises an automated IT system operational improvement method for identifying software applications by associated with operational requirements of processes executed by hardware device 14 with respect to IT system 29. System 100 provides a hardware framework for cognitively performing software (and associated hardware) selections for a selected operational project by mapping hardware/software requirements to multiple hardware frameworks and leveraging meta data for all available software applications comprising a wide range of evaluation parameters. System 100 enables:

A process for combining software models into software/hardware operational solution requirements for enabling an automated self-learning software offering selection (hardware/software) framework. The framework provides flexibility to perform software/hardware evaluations with respect to different levels of granularity of functional capabilities based on a suitability of requirements for a given IT project in combination with a large number of functional and non-functional parameters. A meta model is generated for evaluating software/hardware based parameters including, inter alia, a software/hardware provider, references, a specified geography, non-functional requirements, etc. Meta data retrieved from the meta models enables a process for extracting of the meta data from various associated databases. System 100 executes an accurate hardware/software mechanism for fine tuning weights for various target hardware/software selection framework parameters for each client by employing a syndication guided software sampling strategy and unsupervised feature learning processes with respect to identified target software solution options. The meta model allows for combining sentiment inputs for applicable software based parameters from networking Websites by providing the ability to include broader software attributes for scoring individual parameters for a software/hardware offering selection process.

Figure 2:
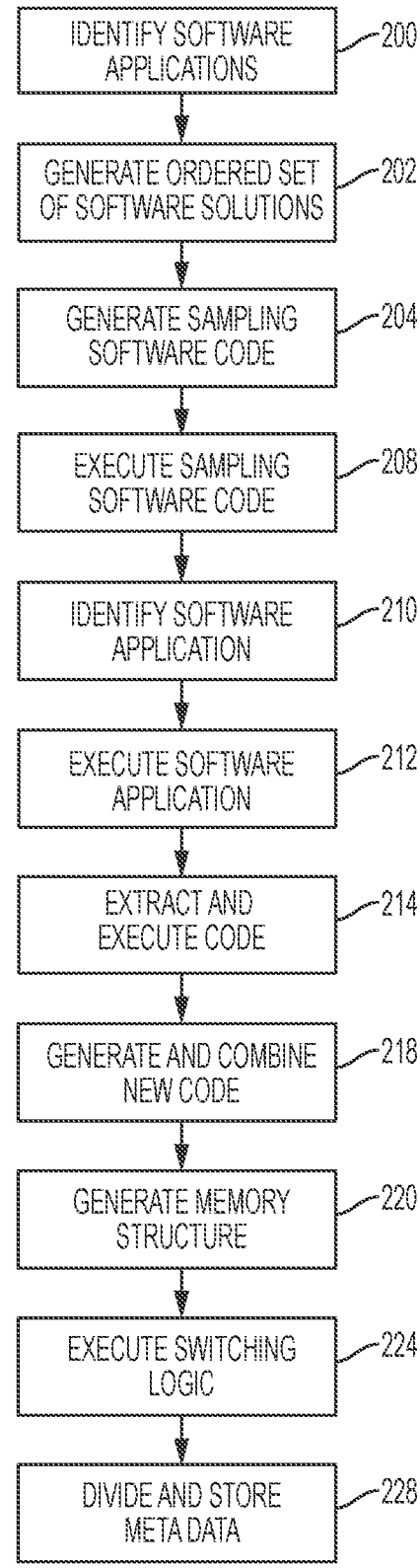
FIG. 2 illustrates an algorithm detailing a process flow enabled by system 100 of FIG. 1 for improving hardware device operation by generating self-learning and/or replicating software code, in accordance with embodiments of the present invention.

FIG. 2 illustrates an algorithm detailing a process flow enabled by system 100 of FIG. 1 for improving hardware device operation by generating self-learning and/or replicating software code, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server 23, database system 21, and/or hardware device 14 of FIG. 1. In step 200, software applications associated with requirements of processes executed by a hardware device with respect to an IT system are identified. The requirements are comprised by metadata. In step 202, an ordered set of software based solutions associated with features for modifying the software applications is generated based on results of step 200. In step 204, sampling software code is generated (based on the software based solutions of step 202) by applying a syndicated sampling technique for enabling the hardware device to execute cognitive self-learning (and replicating) software code with respect to multiple database systems. In step 208, the sampling software code is executed to:
1. Enable an automated learning process for applying a feature learning technique for identifying a set of applicable software applications of the short listed software applications. The requirements may be associated with the set of applicable software applications.
2. Enable an evaluation of the software applications with respect to organizational parameters defined in the metadata for identifying an organizational fitness for the set of applicable software applications.

In step 210, a software application of the set of applicable software applications and an associated feature of the features are selected based on results of step 208. The requirements may be mapped to capabilities of the software application. In step 212, the software application is executed resulting in improved operation of the hardware device. The improved operation of the hardware device may include an improved processing speed for the processor. Alternatively, the improved operation of the hardware device may include an improved memory structure of the hardware device. The improved memory structure may enable an improved access speed for accessing data within the improved memory structure via an internal layered structure of the improved memory structure. In step 214, executable code associated with executing rules for enabling the requirements is extracted from the software application. The executable code is executed resulting in modifying the software application with respect to improving an efficiency and accuracy of the software application. In step 218, additional executable code is generated based on results of step 214. In step 218, the additional executable is combined with the software application resulting in improving the efficiency and accuracy of the software application. In step 220, a memory structure is generated. In step 224, switching logic is executed with respect to the metadata. In step 228, the metadata is divided (by the switching logic) into two differing categories. The metadata stored (in the memory structure) with respect to the two differing categories. The two differing categories may include a first category associated with new software technology trends and a second category associated with new software industry trends.

Figure 3:
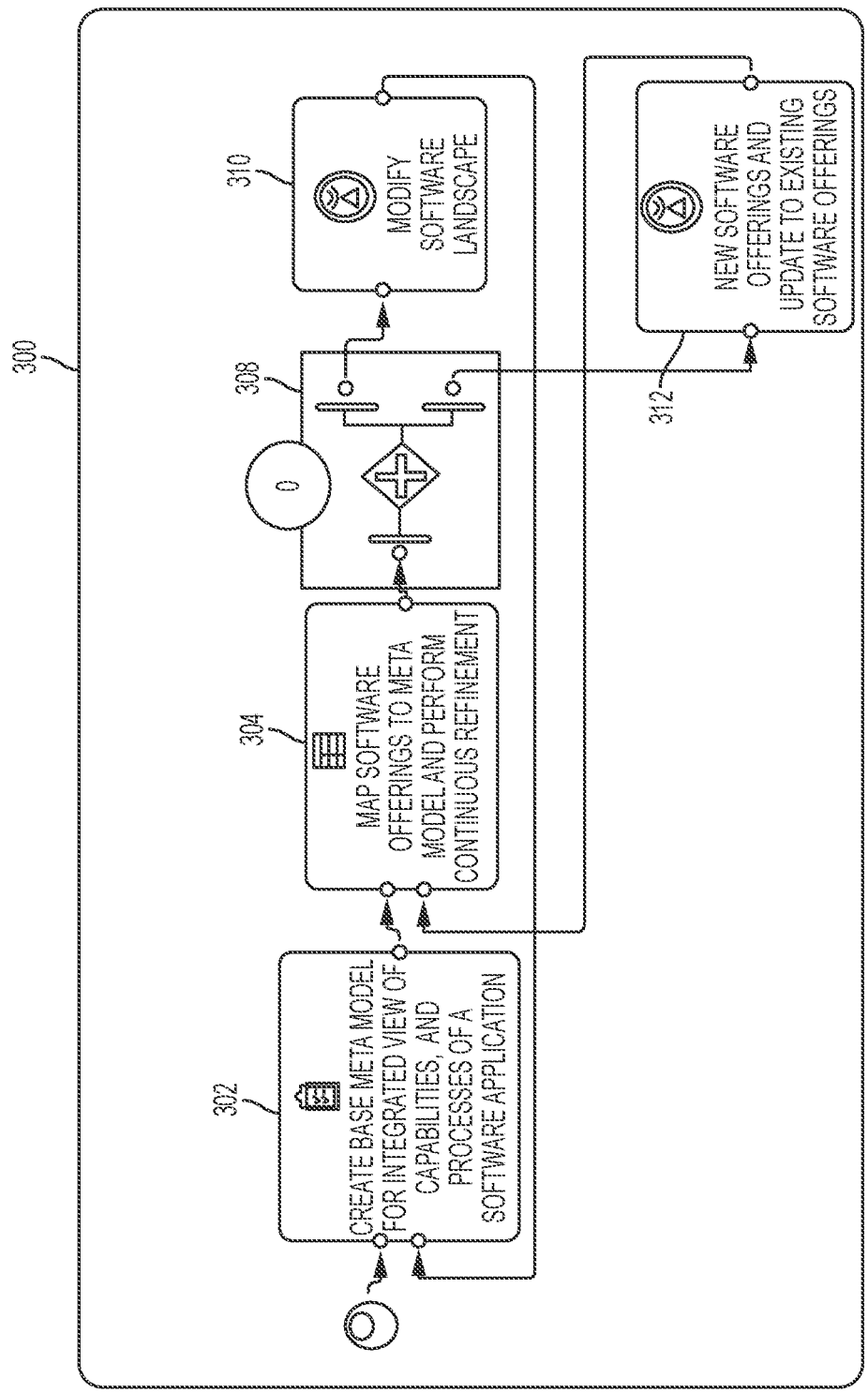
FIG. 3 illustrates switching logic enabled by the system of FIG. 1 for improving hardware device operation by generating self-learning and/or replicating software code, in accordance with embodiments of the present invention

FIG. 3 illustrates switching logic 300 enabled by system 100 of FIG. 1 for improving hardware device operation by generating self-learning and/or replicating software code, in accordance with embodiments of the present invention. Switching logic 300 enables a step 302 for creating a base meta model for presenting an integrated view of capabilities and processes associated with code of a software application for generation or modification. In step 304, software offerings are mapped to the meta model and a continuous refinement process is executed with respect to the software application. An output from step 304 (i.e., the software offerings mapped to the meta model) is passed to a switching circuit 308 for switching between a step 310 for modifying a software application landscape and a step 312 for enabling new software application offerings or enabling updates to existing software applications.

Figure 4:
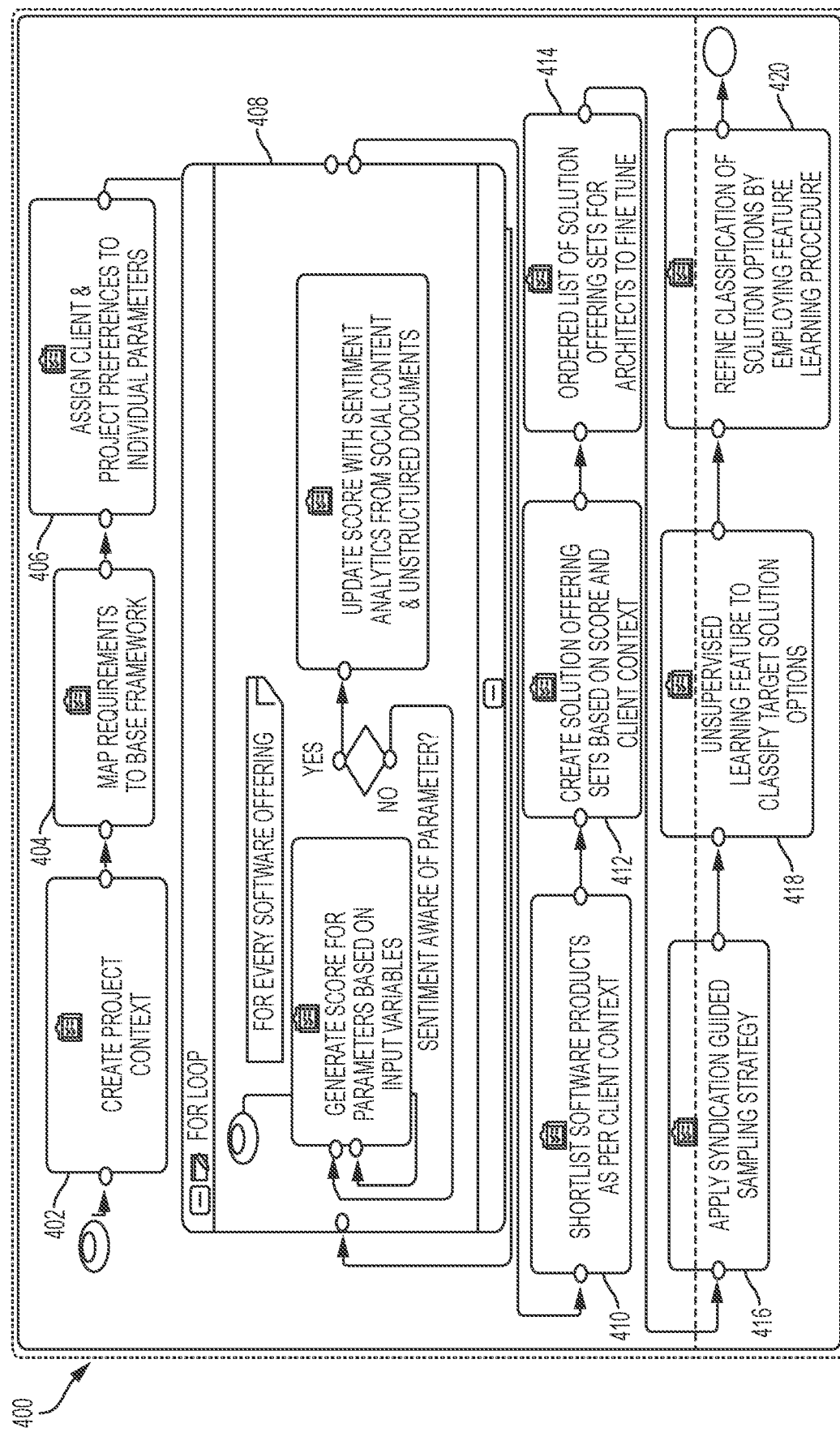
FIG. 4 illustrates an algorithm for executing the switching logic of FIG. 3 for generating self-learning and/or replicating software code, in accordance with embodiments of the present invention.

FIG. 4 illustrates an algorithm for executing switching logic 300 of FIG. 3 for generating self-learning and/or replicating software code, in accordance with embodiments of the present invention. In step 402, a project context for a software application generation project is created. In step 404, requirements for the software application generation project are mapped to a base hardware framework configured for execution of the software application generation project. In step 406, client and project preferences are assigned to individual parameters for the software application generation project. In recursive step 408 (for every available software offering), a score for each of the parameters is generated based on input variables for the software application generation project. If a sentiment aware parameter is located within the parameters of step 408, then an associated score is updated based on analytics from social networking databases and unstructured documents. In step 410, software application products are short listed based on software client context. In step 412, a software solution offering set is created based on the scores of step 408 and the software client context of step 410. In step 414, an ordered list of software offering sets is generated for fine tuning via hardware based architecture. In step 416, a syndication guided sampling strategy is applied to the software application generation project. In step 418, an unsupervised software learning feature is executed with respect to clarifying software target solutions. In step 420, classification of software solution options are refined via execution of the unsupervised software learning feature.

Figure 5:
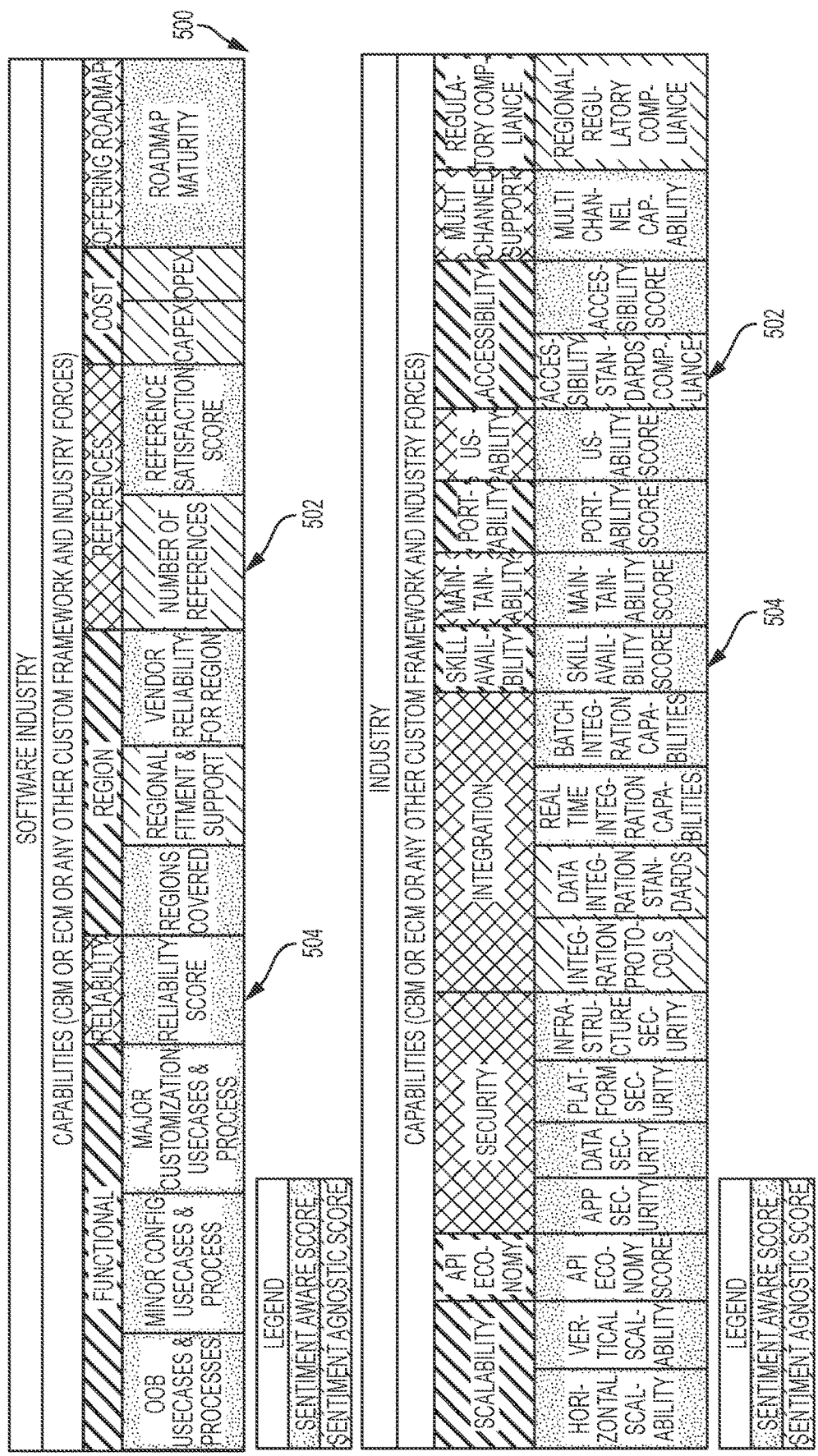
FIG. 5 illustrates an internal view of a memory structure for storing the meta model data of switching logic of FIG. 3, in accordance with embodiments of the present invention.

FIG. 5 illustrates an internal view of a memory structure 500 for storing the meta model data of switching logic 300 of FIG. 3, in accordance with embodiments of the present invention. Switching logic 300 may include any type of switching circuitry including, inter alia, multiplexer circuitry, voltage load circuitry, diode or transistor switching circuitry, logical gate related circuitry, etc. The memory structure 500 is configured to store meta data with respect to two categories: a sentiment aware category and a sentiment agnostic category. Parameters 502 sentiment agnostic category parameters and parameters 504 comprise sentiment aware category parameters. Switching logic 300 analyzes new software trends and modifications to existing software trends to trigger updates to the stored meta data such that new software trends are combined with functional meta data.

Figure 6:
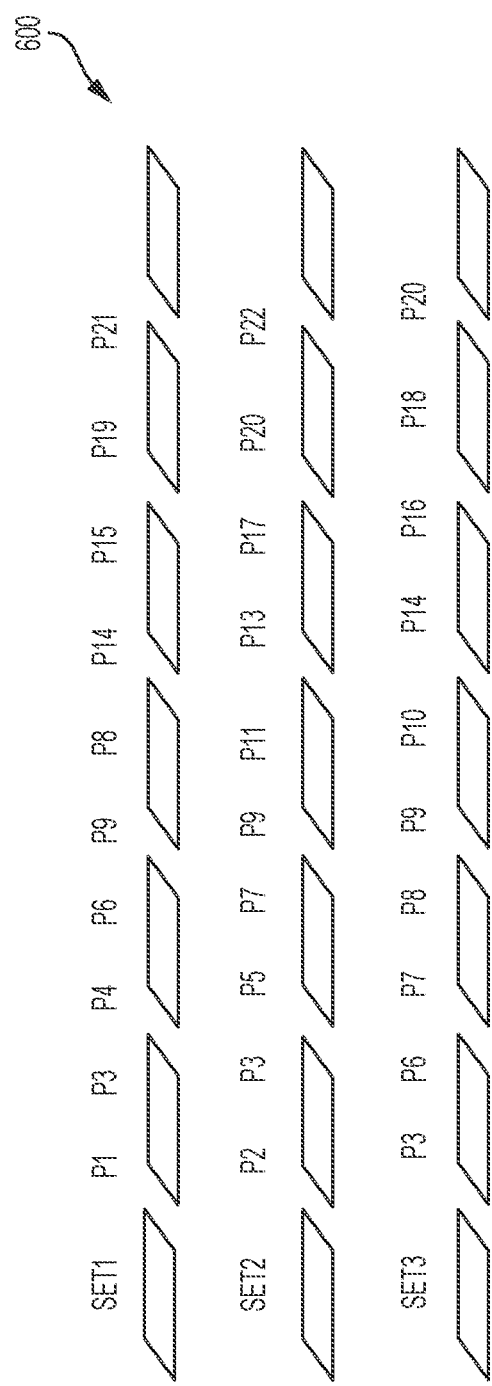
FIG. 6 illustrates execution of a step of FIG. 4 for generating an ordered list of software offering sets of target software solutions for fine tuning via hardware based architecture, in accordance with embodiments of the present invention.

FIG. 6 illustrates execution of step 414 of FIG. 4 for generating an ordered list of software offering sets of target software solutions 600 for fine tuning via hardware based architecture, in accordance with embodiments of the present invention. Target software solutions 600 are stored as ordered data sets p1 . . . p20 representing available software products or platforms.

Figure 7:
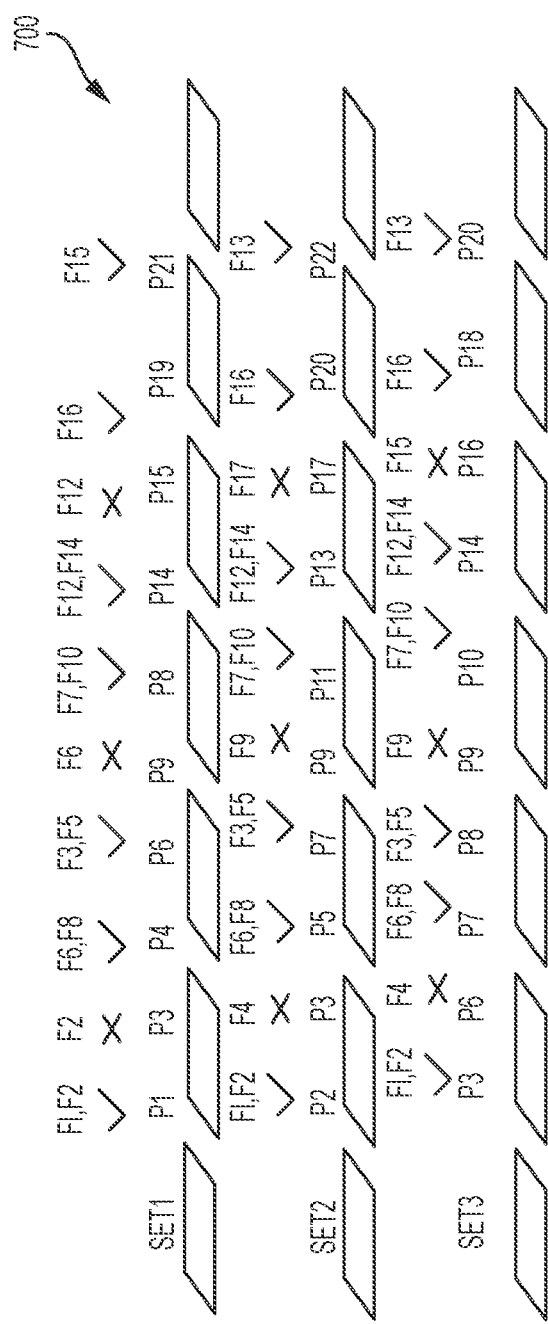
FIG. 7 illustrates execution of a step of FIG. 4 for applying a syndication guided sampling strategy to a software application generation project, in accordance with embodiments of the present invention.

FIG. 7 illustrates execution of step 416 of FIG. 4 for applying a syndication guided sampling strategy to a software application generation project, in accordance with embodiments of the present invention. Target software solutions 700 are stored as ordered data sets p1 . . . p20 representing available software products or platforms. Each of ordered data sets p1 . . . p20 is marked as a pass (i.e., as a checkmark) or fail (i.e., as an x) with respect to execution of software with respect to required software features. In response, a syndicated guided sampling strategy is applied to a hardware device for executing cognitive thinking software code with respect to historical data retrieved (in real time) from multiple data repositories. Additionally, salient software features are identified from software requirements. The salient software features are mapped to software product capabilities.

Figure 8:
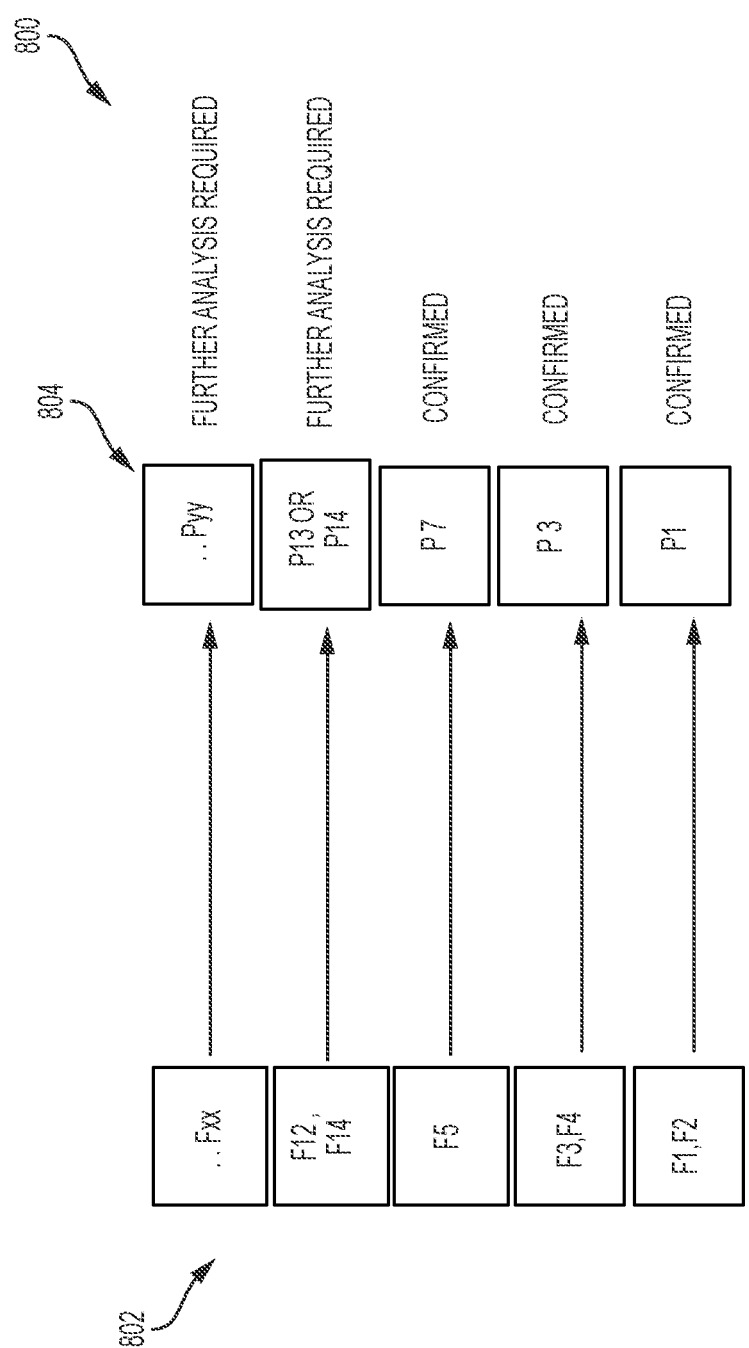
FIG. 8 illustrates execution of a step of FIG. 4 for executing an unsupervised software learning feature with respect to clarifying software target solutions, in accordance with embodiments of the present invention.

FIG. 8 illustrates execution of step 418 of FIG. 4 for executing an unsupervised software learning feature 800 with respect to clarifying software target solutions, in accordance with embodiments of the present invention. Software products 804 with respect to software features 802 are flagged as requiring additional analysis or as confirmed for execution such that associated software is identified.

Figure 9:
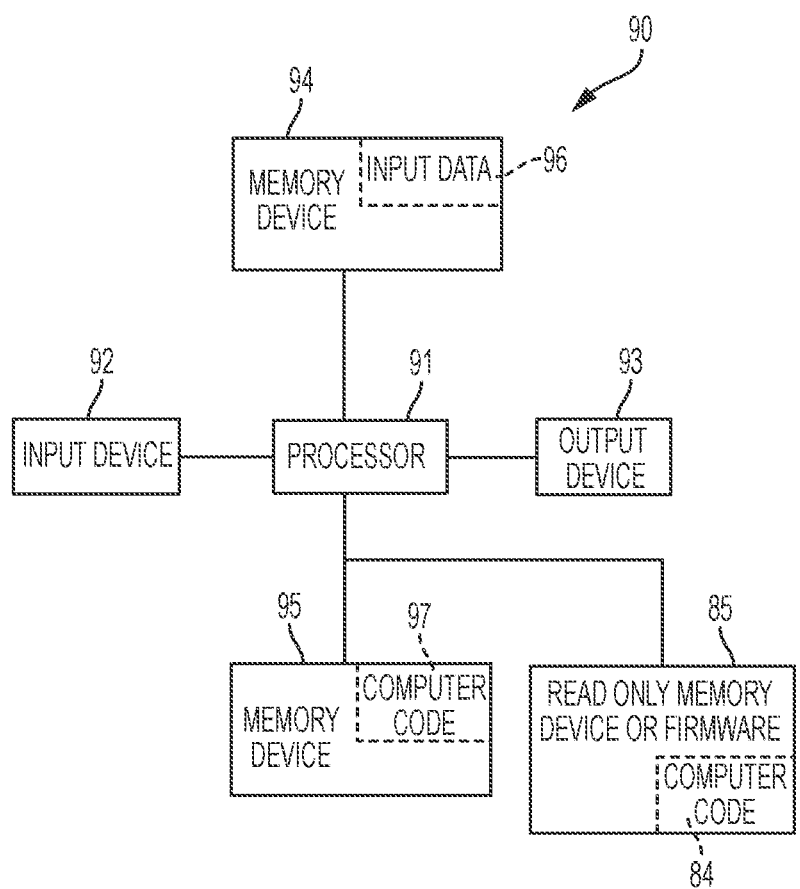
FIG. 9 illustrates a computer system used by the system of FIG. 1 for enabling a process for improving hardware device operation by generating self-learning and/or replicating software code, in accordance with embodiments of the present invention.

FIG. 9 illustrates a computer system 90 (e.g., server 23, database system 21, and hardware device 14 of FIG. 1) used by or comprised by the system of FIG. 1 for improving hardware device operation by generating self-learning and/or replicating software code, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 4 for improving hardware device operation by generating self-learning and/or replicating software code. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2 and 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware device operation by generating self-learning and/or replicating software code. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware device operation by generating self-learning and/or replicating software code. In another embodiment, the invention provides a business method that performs the process steps of the invention on a subscription, advertising, and/or fee basis. That is, a service supplier, such as a Solution Integrator, could offer to enable a process for improving hardware device operation by generating self-learning and/or replicating software code. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated information technology (IT) system operational improvement method comprising:
  identifying, by a processor of a hardware device of an IT system, software applications associated with requirements of processes executed by said hardware device with respect to said IT system, wherein said requirements are comprised by metadata;
  generating, by said processor based on results of said identifying, an ordered set of software based solutions associated with features to modify said software applications;
  generating, by said processor based on software based solutions, sampling software code by applying a syndicated sampling technique, the sampling software code enabling said hardware device to execute cognitive self-learning software code with respect to a plurality of database systems;
  executing, by said processor, said sampling software code enabling an automated learning process and applying a feature learning technique to identify a set of applicable software applications of said software applications;

executing, by said processor, said sampling software code enabling an evaluation of said software applications with respect to organizational parameters defined in said metadata and identifying an organizational fitness for said set of applicable software applications;

identifying, by said processor based on results of said executions of said sampling software code, a software application of said set of applicable software applications and an associated feature of said features; and executing, by said processor, said identified software application resulting in improved operation of said hardware device.

2. The method of claim 1, further comprising:

extracting, by said processor from said software application, executable code associated with executing rules for enabling said requirements;

executing, by said processor, said executable code resulting in modifying said software application with respect to improving an efficiency and accuracy of said software application;

generating, by said processor in response to said executing, additional executable code; and combining, by said processor, said additional executable with said software application resulting in said improving said efficiency and accuracy of said software application.

3. The method of claim 1, further comprising:

generating, by said processor, a memory structure;

executing, by said processor, switching logic with respect to said metadata;

dividing, by said switching logic, said metadata into two differing categories; and storing, by said processor in said memory structure, said metadata with respect to said two differing categories.

4. The method of claim 3, wherein said two differing categories comprise a first category associated with new software technology trends and a second category associated with new software industry trends.

5. The method of claim 1, wherein said requirements are associated with said set of applicable software applications.

6. The method of claim 1, further comprising:

mapping, by said processor, said requirements to capabilities of said software application.

7. The method of claim 1, wherein said improved operation of said hardware device comprises an improved processing speed for said processor.

8. The method of claim 1, wherein said improved operation of said hardware device comprises an improved memory structure of said hardware device, and wherein said improved memory structure enables an improved access speed for accessing data within said improved memory structure via an internal layered structure of said improved memory structure.

9. The method of claim 1, further comprising: providing at least one support service for at least one of creating, integrating, hosting, maintaining, and deploying computer-readable code in the hardware device, said code being executed by the processor to implement: said identifying said set of applicable software applications, said generating said ordered set, said generating said sampling software code, said executing said sampling software code for enabling an automated learning process, said executing said sampling software code for enabling an evaluation of said software applications, said identifying said software application, and said executing said software application.

10. A computer program product, comprising a computer readable hardware storage device storing a computer readable program code, said computer readable program code comprising an algorithm that when executed by a processor of a hardware device of an information technology (IT) system implements an automated IT system operational improvement method, said method comprising:

identifying, by said processor, software applications associated with requirements of processes executed by said hardware device with respect to said IT system, wherein said requirements are comprised by metadata;

generating, by said processor based on results of said identifying, an ordered set of software based solutions associated with features to modify said software applications;

generating, by said processor based on software based solutions, sampling software code by applying a syndicated sampling technique, the sampling software code enabling said hardware device to execute cognitive self-learning software code with respect to a plurality of database systems;

executing, by said processor, said sampling software code enabling an automated learning process and applying a feature learning technique to identify a set of applicable software applications of said software applications;

executing, by said processor, said sampling software code enabling an evaluation of said software applications with respect to organizational parameters defined in said metadata and identifying an organizational fitness for said set of applicable software applications;

identifying, by said processor based on results of said executions of said sampling software code, a software application of said set of applicable software applications and an associated feature of said features; and executing, by said processor, said identified software application resulting in improved operation of said hardware device.

11. The computer program product of claim 10, wherein said method further comprises:

extracting, by said processor from said software application, executable code associated with executing rules for enabling said requirements;

executing, by said processor, said executable code resulting in modifying said software application with respect to improving an efficiency and accuracy of said software application;

generating, by said processor in response to said executing, additional executable code; and combining, by said processor, said additional executable with said software application resulting in said improving said efficiency and accuracy of said software application.

12. The computer program product of claim 10, wherein said method further comprises:

generating, by said processor, a memory structure;

executing, by said processor, switching logic with respect to said metadata;

dividing, by said switching logic, said metadata into two differing categories; and storing, by said processor in said memory structure, said metadata with respect to said two differing categories.

13. The computer program product of claim 12, wherein said two differing categories comprise a first category associated with new software technology trends and a second category associated with new software industry trends.

14. The computer program product of claim 10, wherein said requirements are associated with said set of applicable software applications.

15. The computer program product of claim 10, wherein said method further comprises:
   mapping, by said processor, said requirements to capabilities of said software application.

16. The computer program product of claim 10, wherein said improved operation of said hardware device comprises an improved processing speed for said processor.

17. The computer program product of claim 10, wherein said improved operation of said hardware device comprises an improved memory structure of said hardware device, and wherein said improved memory structure enables an improved access speed for accessing data within said improved memory structure via an internal layered structure of said improved memory structure.

18. A hardware device of an information technology (IT) system comprising a processor coupled to a computer-readable memory unit, said memory unit comprising instructions that when executed by the computer processor implements an automated IT system operational improvement method comprising:
   identifying, by said processor, software applications associated with requirements of processes executed by said hardware device with respect to said IT system, wherein said requirements are comprised by metadata;
   generating, by said processor based on results of said identifying, an ordered set of software based solutions associated with features to modify said software applications;
   generating, by said processor based on software based solutions, sampling software code by applying a syndicated sampling technique, the sampling software code enabling said hardware device to execute cognitive self-learning software code with respect to a plurality of database systems;
   executing, by said processor, said sampling software code enabling an automated learning process and applying a feature learning technique to identify a set of applicable software applications of said software applications;
   executing, by said processor, said sampling software code enabling an evaluation of said software applications with respect to organizational parameters defined in said metadata and identifying an organizational fitness for said set of applicable software applications;
   identifying, by said processor based on results of said executions of said sampling software code, a software application of said set of applicable software applications and an associated feature of said features; and
   executing, by said processor, said identified software application resulting in improved operation of said hardware device.

19. The hardware device of claim 18, wherein said method further comprises:
   extracting, by said processor from said software application, executable code associated with executing rules for enabling said requirements;
   executing, by said processor, said executable code resulting in modifying said software application with respect to improving an efficiency and accuracy of said software application;
   generating, by said processor in response to said executing, additional executable code; and
   combining, by said processor, said additional executable with said software application resulting in said improving said efficiency and accuracy of said software application.

20. The hardware device of claim 18, wherein said method further comprises:
   generating, by said processor, a memory structure;
   executing, by said processor, switching logic with respect to said metadata;
   dividing, by said switching logic, said metadata into two differing categories; and
   storing, by said processor in said memory structure, said metadata with respect to said two differing categories.

* * * * *